United States Patent [19]

Bruno et al.

[11] Patent Number: 4,964,392
[45] Date of Patent: Oct. 23, 1990

[54] BAKING OVEN

[75] Inventors: Adrian A. Bruno; Thomas Diwisch; Ralph Chrzastek; Richard Casanzio, all of Morton Grove, Ill.

[73] Assignee: Middleby Marshall Inc., Morton Grove, Ill.

[21] Appl. No.: 285,287

[22] Filed: Dec. 15, 1988

Related U.S. Application Data

[63] Continuation-in-part of Ser. No. 215,042, Jul. 5, 1988, abandoned.

[51] Int. Cl.⁵ .................. A21B 1/00; F24C 15/32
[52] U.S. Cl. .................. 126/21 A; 126/21 R; 99/443 C; 99/447; 99/386
[58] Field of Search .............. 126/19 R, 19 A, 20, 126/21 R, 21 A, 273 R; 99/443 C, 451, 386, 331, 447; 219/388, 400; 474/8

[56] References Cited

U.S. PATENT DOCUMENTS

| | | | |
|---|---|---|---|
| 3,365,967 | 1/1968 | Moogk | 474/8 |
| 4,297,942 | 11/1981 | Benson et al. | 99/443 C |
| 4,377,109 | 3/1983 | Brown et al. | 126/21 A |
| 4,473,004 | 9/1984 | Wells | 99/443 C |
| 4,474,498 | 10/1984 | Smith | 99/447 |
| 4,576,090 | 3/1986 | Burtea | 126/21 A |
| 4,692,128 | 9/1987 | Sadler | 474/8 |
| 4,776,317 | 10/1988 | Pinnow et al. | 126/21 A |

Primary Examiner—James C. Yeung
Attorney, Agent, or Firm—Laff, Whitesel, Conte & Saret

[57] ABSTRACT

An oven for baking objects, especially pizzas, has an indirect drive for enabling it to accommodate differences in commercial power on a worldwide basis, by simply changing the ratio of gears, sprockets or pulleys. Various access panels and doors on the oven may be opened to facilitate installation, removal, and maintenance of the oven without requiring a significant partial disassembly thereof. An access window is held under gravity in either an open or a closed position in order to eliminate clips, springs, and the like, which may tend to become fatigued and break as a result of the repeated heating and cooling.

23 Claims, 4 Drawing Sheets

BAKING OVEN

This is a continuation-in-part of Ser. No. 07/215,042, filed July 5, 1988, abandoned.

This invention relates to ovens and more particularly to ovens for continuously baking pizzas, bread, and the like, as distinguished from batch cooking.

The oven may bake any suitable baked objects such as bread, cakes, pies, or the like. However, for convenience of description, all such baked objects will be hereinafter called "pizzas". Accordingly, the term "pizza" is to be construed broadly enough to cover anything which may be processed in the inventive oven.

Designers of pizza ovens must consider many problems which relate to such things as continuous baking vs. batch baking, uniformity and distribution of heat, and similar things. In addition, there are a number of convenience features which should be built into a pizza oven, such as features providing for the ease of cleaning, repairing, and use. Still another consideration relates to an adaptability for tailoring the oven to conform to local power requirements throughout the world.

The existing ovens of the described type function very well; however, there is a need for improvement, especially in the areas such as ease of cleaning, maintenance and repair, and in the adaptability for converting the oven to meet specific local requirements, especially different power requirements throughout the world.

Accordingly, an object of the invention is to provide simpler and more easily maintained ovens, of the described type. Here, an object is to provide an oven wherein all parts may be accessed either for repair or for removal and replacement without having to perform a significant amount of disassembly of other parts. Another object is to provide an oven which requires a minimum amount of work and which gives a maximum amount of access for cleaning.

Still another object is to provide a sturdy oven with a minimum number of vulnerable parts which can break off, jam, or the like.

Another object of the invention is to provide safety features which shut down the oven if over heating conditions should develop. In particular, an object is to eliminate the need for a separate control cabinet cooling fan and sensor for protecting control equipment associated with the pizza oven. Here, an object is to utilize sensor functions already present in the oven for sensing a failure of the control cabinet cooling fan.

In keeping with an aspect of the invention, the oven has a conveyor extending through it. Unbaked pizzas are placed on one end of the conveyor to be cooked as they enter one end and move continuously through the oven, emerging fully cooked from the other end of the oven. Inside the oven are a plurality of elongated ducts which uniformly distribute hot air over upper and lower surfaces of the conveyor and, therefore, of pizzas which are to be baked. The oven has access panels which may be removed to give access quickly and easily to the ducts at a location where they may be conveniently moved or picked up at their centers of gravity. Rails on either side of the oven enable the ducts to slide sideways into and out of the oven. An access window is mounted on the front of the oven to securely and stably rest in either an open or a closed position solely under the force of gravity, thus eliminating springs, and catches and complex latches, all of which may experience metal fatigue as a result of the repeated heating and cooling of the oven. An indirectly driven fan enables the driven air speed to be changed quickly and easily, especially in order to switch between 50 and 60 cycle commercial power, for example. All parts of the control system are accessible so that they may be installed, removed, repaired, or replaced without having to substantially disassemble other parts.

A preferred embodiment of the invention is shown in the drawings, where in:

Figure 10:
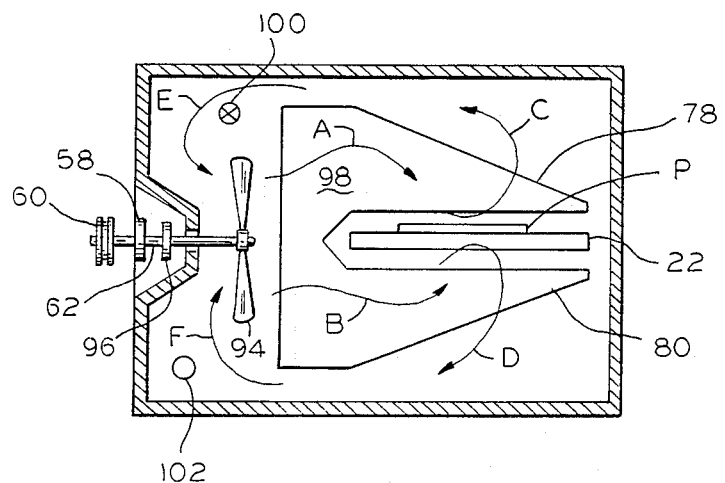
Figure 11:
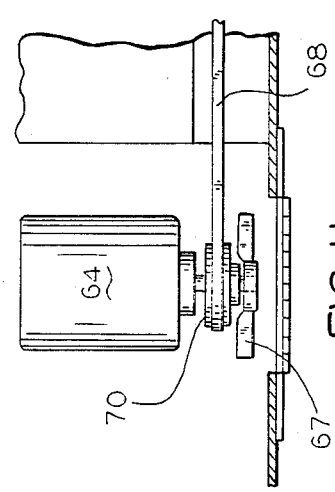
Figure 12:
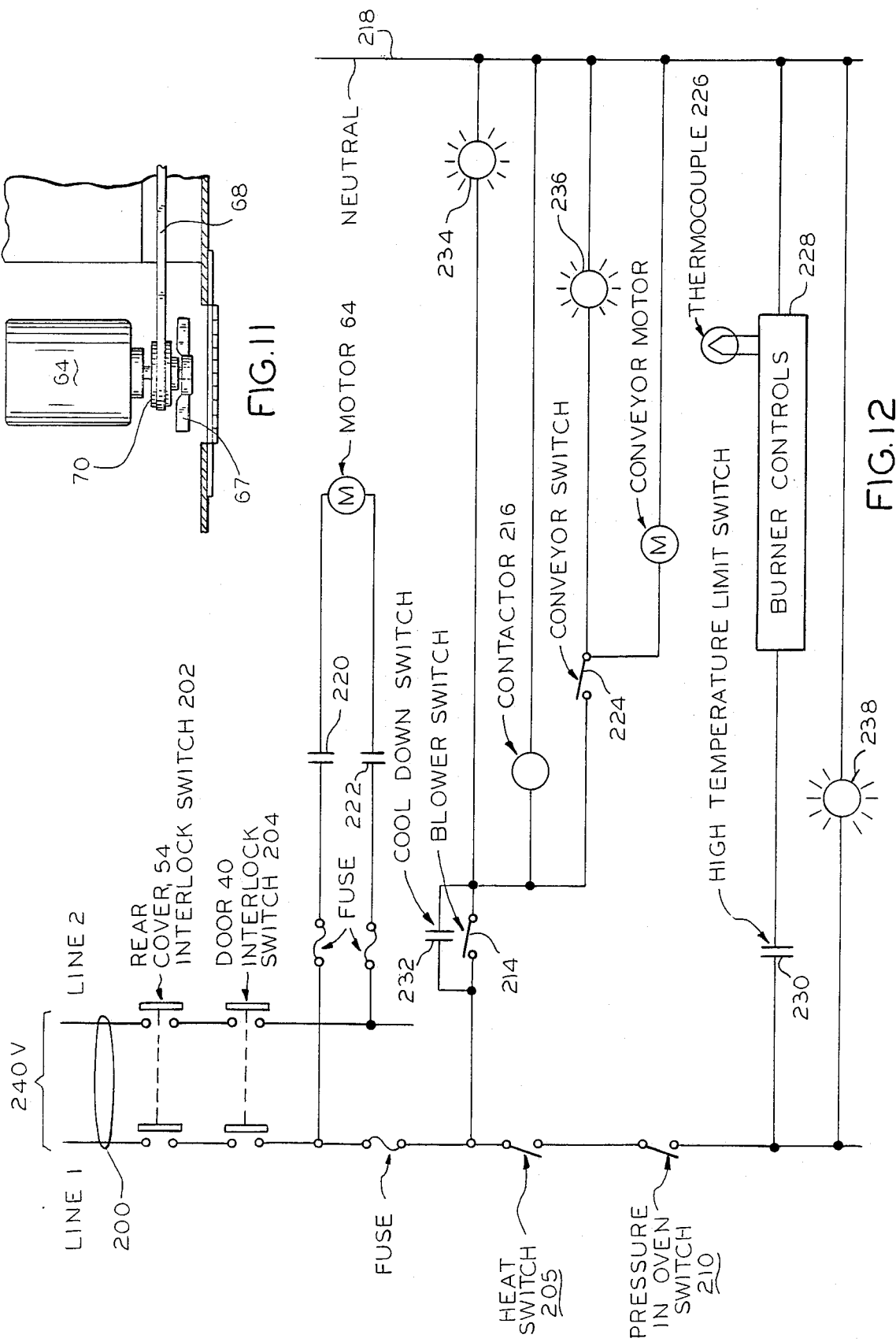

FIG. 10 schematically shows a side view of the interior of the oven;

FIG. 11 is a top plan view of the oven showing the location of the control cabinet cooling fan; and FIG. 12 is a schematic circuit diagram showing, among other things, a sensor in the oven for detecting a failure of both the fan for cooling the control cabinet and the impeller for pressurizing the oven.

Figure 1:
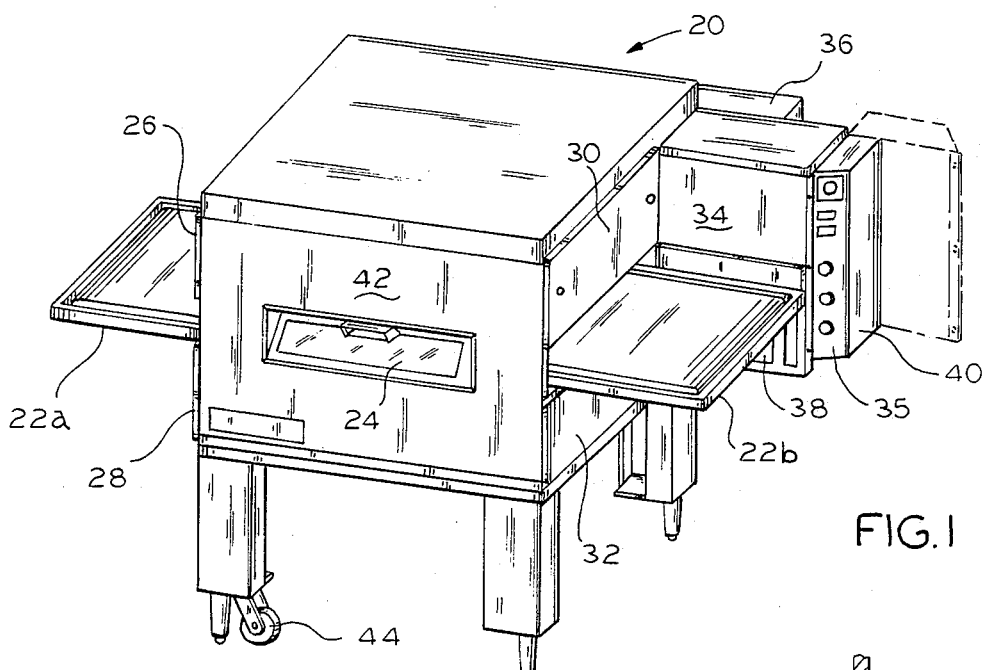
FIG. 1 is a perspective view of the inventive oven.
Figure 2:
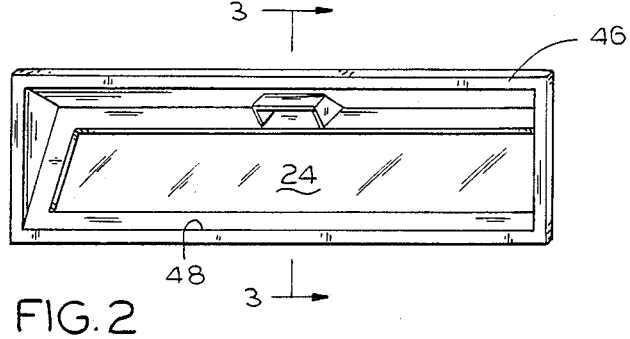
FIG. 2 is a front perspective view of an access window which is resting under gravity in a closed position on the front of the oven.
Figure 3:
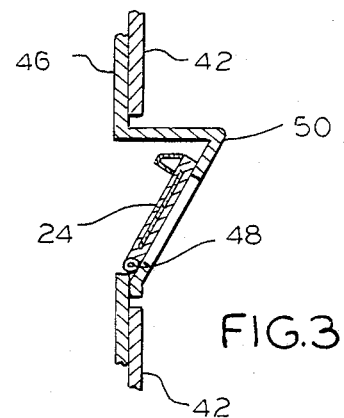
FIG. 3 is a cross section of the access window taken along line 3—3 of FIG. 2.
Figure 4:
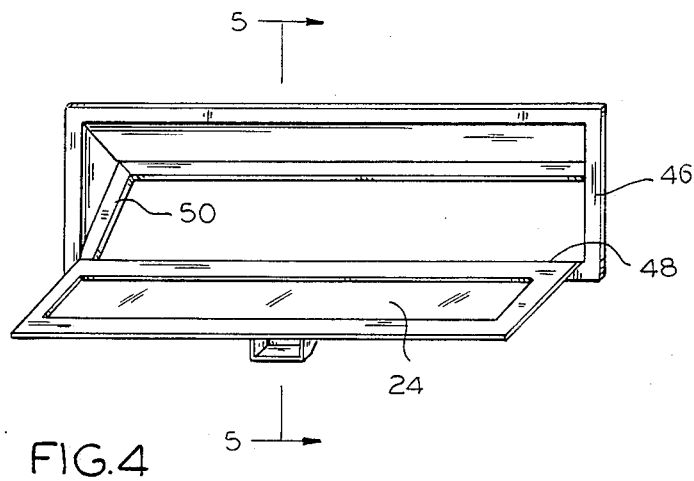
FIG. 4 is a front perspective view of the same window resting under gravity in an open position.
Figure 5:
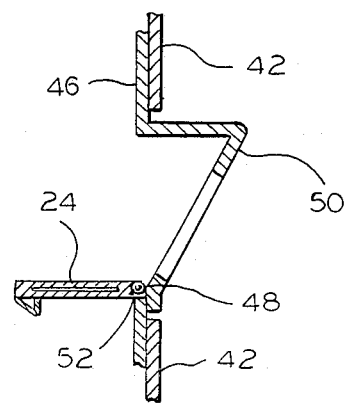
FIG. 5 is a cross-section taken along line 5—5 of FIG. 4.

The major parts of the inventive oven are best seen in FIG. 1 as including a conveyor 22, a gravity positioned access window 24, oven access panels 26-32, a control cabinet 34, a door 35 having a control panel and a back panel 36 for covering an indirect impeller or fan drive. The control cabinet has an access panel 38 as well as door 35 and back housing panel 36, all of which may be opened to give access to controls inside cabinet 34. Heretofore, some ovens have had a large swinging door substantially covering an entire front panel 42. The inventive oven has a permanently affixed front panel with an access window 24 in it. One trouble with prior art arrangements is that the repeated heating and cooling fatigued the latches, catches, springs, etc., so that the large front door might pop open at inappropriate times and leak heat. The oven may be mounted on wheels 44 so that it may be rolled about.

The details of the inventive gravity positioned access window 24 are found in FIGS. 2-5. The front panel 42 of the oven has a rectangular opening formed therein for receiving a rectangular frame 46 which is permanently sealed thereto. Window 24 is hinged at 48 to the lower edge of an opening in the frame 46 which also contains a recessed seat 50 on which window 24 leans. The window leans into the oven far enough to cause the window 24 to swing over center so that its center of gravity is well inside the oven. Thus, gravity reliability holds the window in a closed position. When the window 24 swings to an open position, it rests under gravity upon an edge 52 of the frame 46. Therefore, gravity holds it in both the open and closed positions.

There are several reasons why the gravity positioned access window is important. If the window should open unexpectedly, as often happens with latching windows, the hot window and gas within the oven could burn a person who is nearby. Also, it wastes heat and, therefore, is unduly expensive. For these reasons, it has heretofore been customary to provide locks, clips or springs for positively latching the window. The repeated heating and cooling of the oven leads to metal fatigue and an early failure of these clips and springs. Mechanical latches have been used in the past to avoid clips and springs with their fatigue problems. However, these latches have been both complicated and expensive.

Figure 6:
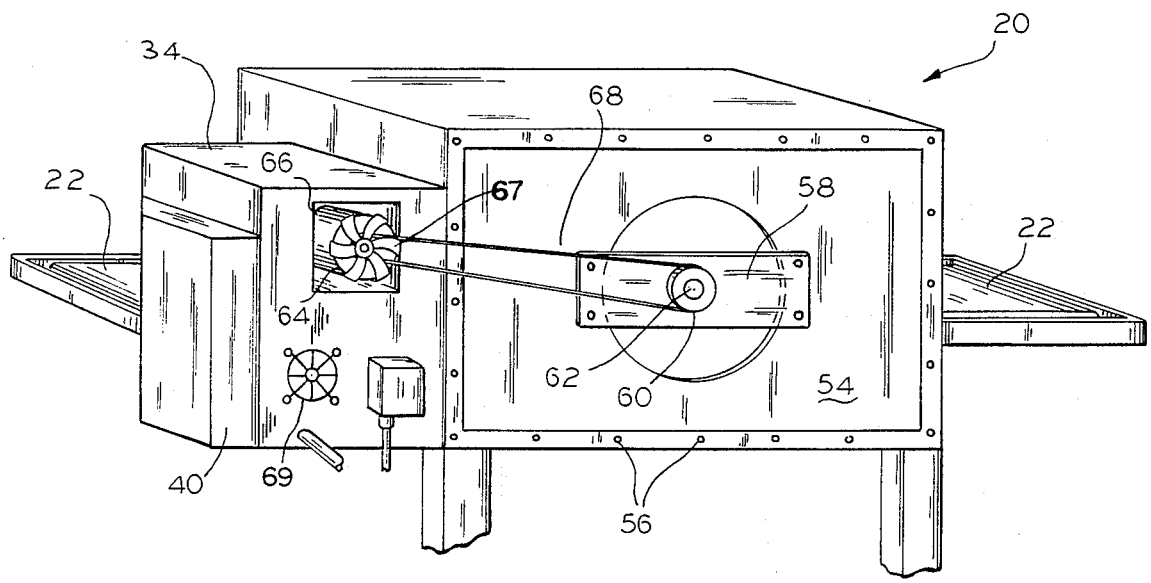
FIG. 6 is a back elevation of the inventive oven showing the indirect impeller or fan drive.

FIG. 6 is a perspective view of the back of oven 20 with the indirect drive housing panel 36 (FIG. 1) removed. A removable back panel 54 may be attached to the oven by any suitable number of screws 56. A rear shaft bearing support plate 58 supports a pair of bearings for impeller shaft 62 having a gear, pulley or sprocket wheel 60 mounted thereon. A suitable gear train, belt or link chain interconnects, wheel 70 on the motor shaft and wheel 60 on the impeller shaft 61. Through an access opening 66, a motor 64 is mounted in control cabinet 34 in such a manner that it may be installed, removed, and replaced without requiring any significant disassembly of other components.

It will always be necessary to provide a motor 64 which is compatible with the commercial power standards of a nation, e.g. 50 Hz, 60 Hz, 120V., 240 V., etc. However, once that is done with the invention, to change the impeller or fan speed, it is only necessary to change the ratio of the diameters of gears, pulley or sprocket wheels 60, 70. In one embodiment of the invention, one, of these was a pulley which had adjustable sheaves so that the impeller or, fan speed could be continuously adjustable.

More particularly, heretofore, the impeller or fans on this type of oven have had to be changed because they have been directly driven by being mounted on the shaft of a motor which is supported on back panel 54 or support 58. Since the air moving capability of such a system depends upon a number of variables such as the rotational speed of the motor, the size and pitch of the impeller or fan, and the like, an oven originally designed for use in a country having 60-cycle commercial power, for example, heretofore has had to have its entire air delivery system modified if it is sold into a country having 50-cycle power. Even then, the replacement parts may not perfectly produce the same results so that a compromise must be accepted.

With the invention, it is only necessary to supply the proper pulley or sprocket wheels 60, 70. When one of these wheels is a pulley with adjustable sheaves, it is possible to make minor adjustments to infinitely vary the rotational speed in order to cause the impeller or fan to rotate at its designed speed and deliver exactly the proper amount of air.

Figure 7:
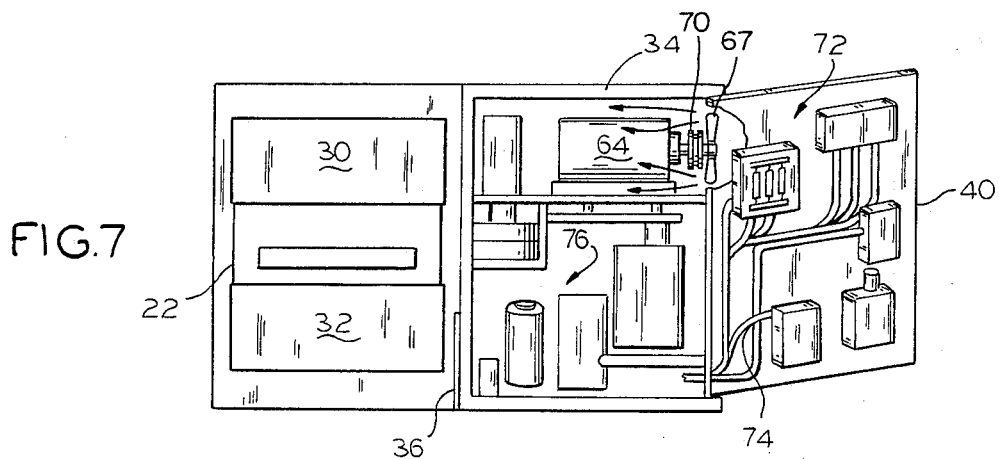
FIG. 7 shows a control cabinet with an access door in an open position.

The control cabinet 34 (FIGS. 1, 7) contains many components which are arranged in such a manner that any of them may be conveniently, quickly, and easily installed, removed, and repaired or replaced without having to remove or disassemble other parts. Among other things, this convenience is because access panels 36, 38 (FIG. 1) may be removed and, a front door 40 of control cabinet 34 may be opened. With the door 40 open, it is possible to manipulate, install, remove, repair and to make electrical connections to all components in the cabinet. When door 40 is closed, controls 35 (FIG. 1) are positioned for easy access and manipulation. The electrical control circuits are connected by a wiring harness 74 (FIG. 7) to the individual oven components 76 (e.g. gas valves, burner, conveyor motor, etc.) which are required to supply and control the heat in the oven, the conveyor 22 speed, and the like. The motor 64, which is primarily installed and manipulated through the access opening 66 (FIG. 6) in the back of the cabinet, may be further accessed through door 40.

A number of public and private agencies set safety standards for devices such as the inventive oven. One such safety standard requires a cooling fan to keep the control cabinet 34 (FIG. 7) within a temperature range which is below the rated temperature of components used in the various control circuits and other devices.

Therefore, it has been common practice to use a separate electric fan which blows a fresh and cooling air stream through cabinet 34. The safety standards set by regulatory and other agencies also require a system to shut down the oven if this cooling air stream disappears. The practice has been to provide a sail switch positioned in the path of the air stream from the separate control cabinet fan. As long as the air stream is blowing, the sail moves forward to operate a switch. If the air stream stops, the sail returns under spring bias to a normal position to release the switch and shut down the system. One difficulty is that such a sail switch is a very delicate device which is easily damaged and subject to failure.

According to the invention, a cooling air stream is driven which is easily damaged and subject to failure.

According to the invention, a cooling air stream is driven through the control cabinet by a fan 67 (FIGS. 6, 7, and 11) mounted directly on the shaft of the main motor 64. Both the fan 67 and the main oven impeller 94 are rotated by a common drive system including motor 64, pulleys or sprocket wheels 60, 70, and belt or link chain 68. Therefore, if the main oven pressurizing impeller 94 is turning, the cooling fan 67 is also turning. The intake (or outlet) for the air stream is a grille 69.

Completely independent of the control cabinet requirements, a pressure sensor is required in the oven to shut down the system if impeller 94 fails to turn because such an impeller failure would otherwise permit the oven to overheat and the temperature to raise to a dangerous level. Therefore, according to the invention, this pressure sensor is used to control a shut down of both the control cabinet cooling fan 67 and the oven pressurizing impeller 94, thereby eliminating the delicate and overly critical sail switch which has been used heretofore.

FIG. 12 is a circuit diagram showing features of the controls for the oven fan and impeller. More particularly, the 240-V line 200 is connected through interlocking switches 202, 204 which must be operated by a properly closed rear cover 54 and door 40 before power may be applied to place the oven into operation. Line 1 of the 240-volt line is the hot or energized line leading into the oven controls.

Before the burner may be operated to generate any heat, it is first necessary to close a manual switch 208. Then, the motor 64 turns the impeller 94 which must pressurize the oven before a pressure sensitive switch 210 may close. If the air pressure should drop inside the oven, switch 210 opens to remove the electrical power supplied to the burner controls, thereby shutting down the burner and removing the source of heat from the oven.

A manually operated blower switch 214 is a closed to prepare a start circuit for the blower motor 64. In greater detail, when the blower switch 214 is closed, a circuit is completed from line 1, through a contractor coil 216 to a neutral wire 218 of the 240-volt line. The contactor operates and closes many contacts throughout the control circuit, two of which are shown at 220, 222. The closure of these two contacts completes a circuit to operate motor 64. If the manual blower switch 214 is opened, contactor 216 releases and contacts 220, 222 open to stop the motor 64.

A conveyor switch 224 is connected in series with blower switch 214; therefore, the conveyor 22 (FIG. 6) cannot operate unless the blower is also operating.

The temperature in the oven is regulated by a thermocouple 226 which is coupled to the burner controls 228 (a standard commercial item). However, as a safety feature, the maximum temperature in the oven is also controlled by a high temperature limit switch 230 which is in the nature of a thermostat that opens the electrical circuit to the burner control 228 at some fixed temperature such as 600° F.

A cool down limit switch 232 is connected in parallel with the blower switch 214 in order to insure a proper cooling of the oven after shut down. More particularly, the switch 214 is closed on an initial start up and remains closed until it is manually opened when the oven is shut down. After shut down and the opening of switch 214, the motor 64 is controlled by cool down switch 232 which is in the nature of a thermostat. If the oven is hot on shut down, the impeller 94 should continue to run and to cool the oven until its internal temperature is below some limit such as 180 F. At that limit, contacts 232 open to stop the motor and therefore the impeller 94.

Various pilot lights 234, 236, 238 light to indicate when the various operations are in progress.

The operation of the circuit begins when manual switches 208, 214 are closed. The contacts 214 operate contactor 216 to start the blower motor 64 so that impeller 84 builds air pressure within the oven. When the air pressure become high enough, switch 210 closes to energize the burner controls 228 and start the generation of heat, which is regulated in response to an electrical signal from thermocouple 226.

The conveyor 22 is started by an operation of manual switch 224 at anytime after the blower switch 214 is closed. Any suitable device, such as a tachometer (not shown) may be provided to control the conveyor speed and, therefore, the oven dwell time while a product is being baked in the oven.

As long as the blower motor 64 and impeller 94 are turning properly, suitable air pressure is maintained in the oven and pressure sensitive switch 210 remains closed. If either the motor 64 or impeller 94 should fail (fan belt 68 should break, for example), pressure sensitive switch 210 opens to turn off the burner controls 228 and cool the oven. The circuit including contacts 214 is not affected by an opening of contacts 210 since, to the extent that the motor or impeller might still be able to cool the oven, it should continue to do so.

In the prior art, the control cabinet 40 was cooled by a separate fan, which required its own sensor. With the invention both the separate control cabinet sensor and switch have been eliminated without any sacrifice of safety because the cabinet 34 is cooled as long as the oven is pressurized. If oven pressure is lost, contacts 210 open to remove all heat. Therefore, the single sensor 210 performs the dual control over both fan 67 and impeller 94.

This is important for three reasons. First, a high level of safety is achieved because the motor 84 has more power to support a larger fan and is of a type which is more reliable than some of the separate fan motors used heretofore on control cabinets. Second, there is a savings of cost since a separate motor and sensor are no longer required for the control cabinet. Third, the control cabinet sensor was typically a sail which was blown by an air stream from the fan motor. Such a sail switch is overly sensitive, easily damaged and, therefore, a source of trouble.

Figure 8:
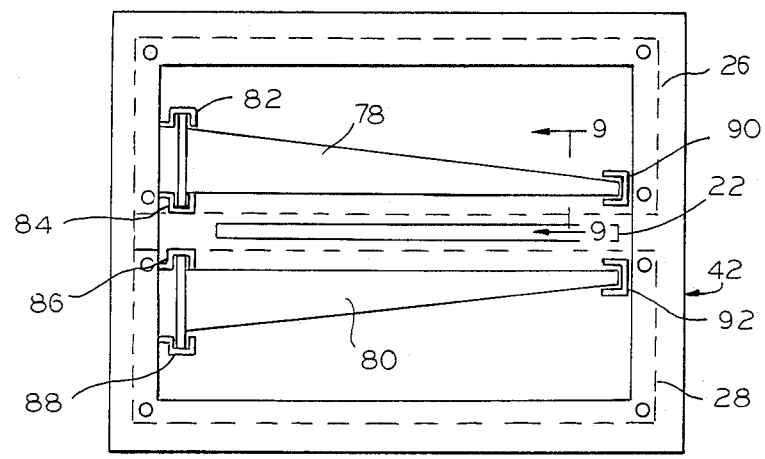
FIG. 8 is a side view of the oven with access panels removed and showing ducts for distributing heated air.

FIG. 8 is an end view of the oven, with the access panels 26, 28 (represented by dashed lines) removed. The conveyor 22 is not normally removed unless there is a major cleaning or overhaul of the oven. Unbaked pizzas are placed on end 22a (FIG. 1) of the conveyor 22 which moves them through the oven at a uniform speed during a carefully controlled time period. For example, it might require 5-10 minutes for the conveyor to carry the pizza completely through the oven. Unbaked pizzas are placed on conveyor end 22a (FIG. 1) and are removed from conveyor end 22b after they have moved through the oven. Therefore, the baking is a continuous process, with unbaked pizzas being added to the conveyor 22 as fast as the baked ones are removed.

While the pizzas are on the conveyor 22 and are in the oven, hot air is blown onto them from a plurality of ducts 78, 80 (FIG. 8). The ducts are tapered so that the hot air delivered to the pizza is uniform.

There may be as many as four ducts on both the top and the bottom of the conveyor (a total of six to eight ducts). These ducts may be removed from and returned to the oven for any of many reasons. For example, during cooking, juices may splatter over the ducts, which must then be cleaned.

In the prior art, the oven often opened at the front 42 instead of at the end, as shown in FIG. 8. Then, it became necessary to lift the ducts 78, 80 while holding them near the small end. This required the installer to support a rather large and awkward lever arm by holding one end, which was cumbersome. Also, it was necessary to hook the large end of the ducts into some kind of support, at the side of the oven which is opposite the installer. The installer's view may then be blocked by the ducts which are being installed.

Instead of this rather awkward procedure followed by the prior art, the opening in the end of the inventive oven which is provided by a removal of access panels 26, 28 allows the installer to grasp and handle the ducts while holding them near their center of gravity. For this purpose, tracks 82-88 (FIG. 8) are provided at upper and lower edges of the large end of the ducts. Tracks 90, 92 are provided at their small ends. Thus, it is only necessary to slip the ducts 78, 80 sideways into these tracks 82-92 and then push then them along the tracks to a desired position within the oven.

Figure 9:
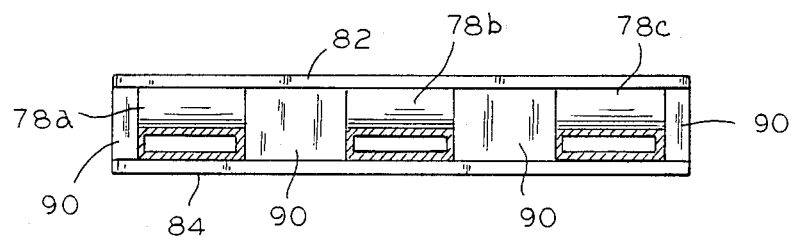
FIG. 9 is an end view cross section taken along line 9—9 of FIG. 8.

FIG. 9 is an end view of the ducts taken along line 9—9, and looking toward the front of the oven. Each of the ducts 78a, 78b, 78c has been slid sideways to a desired position. As each duct is installed, another duct or a filler plate 90 is inserted immediately adjacent it. Therefore, all the spaces between the ducts are filled. Thus, depending upon the needs of any particular bake requirements, and by substituting filler plates for ducts, any suitable number of ducts may be provided, such as two, three, or four, for example.

FIG. 10 illustrates the operation of the oven. An impeller 94 is mounted on a shaft 62 supported at rear bearings 58 and forward bearing 96. The impeller is driven via gear, sprocket or pulley wheel 60 mounted on shaft 62. This forces a draft of air into a plenum 98 which guides and directs it into the ducts 78, 80.

Arrows in FIG. 10 generally depict the path which is followed by the air. Arrows A, B show the air entering the plenum and continuing through ducts 78, 80. Arrows C, D show the air leaving the ducts, bathing the upper and lower surface of pizza P and exiting into the oven generally. The arrows E, F indicate that the heated air returns to the impeller 94 which again drives it into the plenum, as shown by arrows A, B.

A sensor 100 is located at any convenient point in the air flow to monitor the instantaneous air temperature. A burner 102 is also located at any convenient position within the air stream to supply heat to the pizza.

Those who are skilled in the art will readily perceive how modifications may be made within the scope and spirit of the invention. Therefore, the appended claims should be construed to cover all equivalent structures.

What is claimed is

1. A baking oven comprising an oven, a substantially flat conveyor extending into one side through said oven and out the other side of said oven for continuously carrying baking objects from said one side through said oven and out the other side of said oven, a pair of access panels attached to at least one end of said oven and above and below said conveyor leaving only enough room for said baking object to be carried through said oven, whereby said oven access panels may be removed to provide complete access to said oven at the end of said conveyor, and an access window hinged on one side to a front of said oven for giving access at a side of said conveyor within said oven, said access window resting solely under gravity in either an open or a closed position.

2. The oven of claim 1, wherein said access window comprises a frame having said window hinged to the bottom thereof, the top of said window being supported by a recessed member in at least the top of said frame which allows said window to lean into said oven when closed in order to place the center of gravity well within said oven.

3. The oven of claim 2 wherein said frame has a support for holding said window when open with the center of gravity of said window well outside said oven.

4. The oven of claim 1 and a control cabinet on said oven with a door having a control panel with a plurality of controls thereon, a plurality of control access panels on said control cabinet, and components within said cabinet which are at locations therein where they may be installed and removed without requiring a disassembly of other components when said control access panels and said cabinet door are open.

5. The oven of claim 1 and motor means, impeller means, and means for indirectly driving said impeller means from said motor means, whereby said indirect drive may be altered to accommodate different forms of commercial power in order to provide for world wide use of said oven.

6. The oven of claim 5 and a first rotating wheel means driven by said motor, a second rotating wheel for driving said impeller, and means for interconnecting said first and second rotating wheels, whereby different commercial power supplies may be accommodated by changing the ratios of said first and second rotating wheels.

7. The oven of claim 6 and a control cabinet containing equipment for controlling and operating said oven, said motor means being mounted in said control cabinet, a fan mounted on and turning with a shaft of said motor for moving a cooling stream of air through said control cabinet.

8. The oven of claim 1 and at least one duct means for conveying air from said impeller to said baking objects, and means for enabling said duct means to be installed and removed via said oven access panels, said duct means being positioned to be so installed and removed by enabling it to be manipulated at substantially its center of gravity.

9. The oven of claim 8 and means for mounting any of several numbers of duct means in said oven at selected locations whereby the distribution of air in said oven may be varied.

10. The oven of claim 9 and means responsive to said impeller means for circulating and recirculating hot air through said ducts, over said baking objects, and back to said impeller; burner means in the path of said circulating air for selectively adding heat thereto; sensor means for detecting the temperature of said circulating air; and means responsive to said sensor means for controlling heat supplied to said circulating air to maintain said air at a stable temperature.

11. A baking oven comprising an oven, a substantially flat conveyor extending into one side through said oven and out the other side of said oven for continuously carrying baking objects from said one side through said oven and out the other side of said oven, a pair of oven access panels attached to at least one end of said oven and above and below said conveyor leaving only enough room for said baking object to be carried through said oven, whereby said oven access panels may be removed to provide complete access to said oven at the end of said conveyor, an access window hinged on one side to a front of said oven for giving access at a side of said conveyor within said oven, said access window resting solely under gravity in either an open or a closed position, an impeller, at least one duct means for conveying air from said impeller to said baking objects, means for enabling said duct means to be installed and removed via said oven access panels, said duct means being positioned to be so installed and removed by enabling it to be manipulated at substantially its center of gravity, means for mounting any of several numbers of duct means in said oven at selected locations whereby the distribution of air in said oven may be varied, tracks provided at opposite sides of said oven for a plurality of said ducts to slide sideways through said oven, and filler plates for covering unused space along said tracks whereby the number of duct may be changed by varying the size of said filler plates.

12. A pizza oven comprising a plurality of duct means for delivering hot air to bake pizzas, rotating air moving means for driving air through said duct means and onto said pizzas, motor means, indirect drive means for transferring energy from said motor means to said air moving means, whereby said oven may be adapted to accommodate worldwide commercial power differences by changing said indirect drive means, said air moving means having a first rotating shaft with a first wheel mounted thereon, said motor means having a second rotating shaft with a second wheel mounted thereon, said indirect drive means comprising means for changing the ratio of relative diameters of said first and second wheel means, continuously operating conveyor means for transporting pizzas through said oven and past said duct means, oven access plates for closing said oven above and below said conveyor to reduce an open space adjacent said conveyor to an amount of space that is required to convey a pizza through said oven or to open said space for maintenance within oven, a control cabinet on said oven with a panel having control devices mounted thereon for controlling said oven, components inside said control cabinet which may be accessed via control access panels and door means for enabling said components to be installed and removed without requiring disassembly of other component means, and access window means in front of said oven, said access window means having open and closed positions in which gravity alone holds said access window in either of two stable positions.

13. The oven of claim 12 and a fan on said second rotating shaft for moving a cooling stream of air over said components inside said control cabinet, and eliminates a separate fan and sensor.

14. A baking oven comprising an oven, a substantially flat conveyor extending into one side through said oven and out the other side of said oven for continuously carrying baking objects from said one side through said oven and out the other side of aid oven, a pair of oven access panels attached to at least one end of said oven and above and below said conveyor leaving only enough room for said baking object to be carried through said oven, whereby said oven access panels may be removed to provide complete access to said oven at the end of said conveyor, an access window hinged on one side to a front of said oven for giving access at a side of said conveyor within said oven, said access window resting solely under gravity in either an open or a closed position, a control cabinet on said oven with a door having a control panel with a plurality of controls thereon, a plurality of control access panels on said control cabinet, components within said cabinet which are at locations therein where they may be installed and removed without requiring a disassembly of other components when said control access panels and said cabinet door are open, a motor in said control cabinet having a shaft with a pulley and a fan on it, impeller means in said oven and rotated via said pulley for driving air through said oven, whereby said fan and said impeller inherently either rotate or do not rotate together, sensor means in said oven for detecting a failure of said impeller to rotate, whereby said sensor means also detects a failure of said fan to rotate, and means responsive to said sensor for shutting down any heat source said oven when said fan and said impeller fail to rotate.

15. A baking oven comprising an oven, a substantially flat conveyor extending into one side through said oven and out the other side of aid oven for continuously carrying baking objects from said one side through said oven and out the other side of said oven, a pair of oven access panels attached to at least one end of said oven and above and below said conveyor leaving only enough room for said baking object to be carried through said oven, whereby said oven access panels may be removed to provide complete access to said oven at the end of said conveyor, an access window hinged on one side to a front of said oven for giving access at a side of said conveyor within said oven, said access window resting solely under gravity in either an open or a closed position, motor means, impeller means, means for indirectly driving said impeller means from said motor means, whereby said indirect drive may be altered to accommodate different forms of commercial power in order to provide for a world wide use of said oven, control cabinet means for a world wide use of said oven, control cabinet means for controlling said oven, said motor means being mounted in said control cabinet means, a fan mounted on and turning with a shaft of said motor, sensor means in said oven for sensing proper operation of said impeller means and therefore also sensing a proper operation of said fan, and means responsive to said sensor means for shutting down said oven if said impeller fails to deliver an air stream.

16. A pizza oven comprising a plurality of duct means for delivering hot air to bake pizzas, rotating air moving means for driving air through said duct means and onto said pizzas, motor means, indirect drive means for transferring energy from said motor means to said air moving means, whereby said oven may be adapted to accommodate worldwide commercial power differences by changing said indirect drive means, control means enclosed within a housing for controlling said oven, said control means having a maximum temperature within said housing above which said control means should not go, said motor means being mounted within said housing, and a fan mounted on and turning with a shaft of said motor for moving a stream of cooling air through said housing and across said control means.

17. The oven of claim 16 and sensor means for determining when one of said rotating air moving means and said fan mean is not operating, and means responsive to said sensor means for shutting down said oven.

18. A pizza oven comprising a plurality of duct means for delivering hot air to bake pizzas, rotating air moving means for driving air through said duct means, motor means, and continuously variable indirect drive means for transferring energy from said motor means to said rotating air moving means, whereby said oven may be adapted to world wide usage by changing said indirect drive means, conveyor means for continuously transporting pizzas through said oven, oven access plates for closing said oven above and below said conveyor means to reduce open spaces adjacent said conveyor to an amount of space that is required to conveyor pizzas through said oven or to open said space for maintenance within said oven.

19. The pizza oven of claim 18 wherein said air moving means has a first rotating shaft with a first wheel mounted thereon, said motor means has a second rotating shaft with a second wheel mounted thereon, and said indirect drive means comprises means for changing the ratio of relative diameters of said first and second wheel means.

20. The pizza oven of claim 19 wherein said first and second wheels are pulley wheels and said continuously variable indirect drive means for changing the ratio of said changing means comprises moveable sheaves on at least one of said pulley means.

21. The pizza oven of claim 19 and a control cabinet mounted on said oven with a panel having controls thereon for controlling aid oven and oven components inside said control cabinet, cabinet access panel and door means for enabling control components to be installed in and removed from said cabinet without requiring a disassembly of other oven component means.

22. The pizza oven of claim 19 and access window means in front of said oven, said access window having open and closed positions in both of which gravity exclusively holds said access window in a stable position.

23. The oven of claim 18 and a control cabinet containing equipment for controlling and operating said oven, said motor means being mounted in said control cabinet, a fan mounted on and turning with a shaft of said motor for moving a cooling stream of air through said control cabinet.

* * * * *